United States Patent [19]

Hille et al.

[11] Patent Number: 4,945,128

[45] Date of Patent: Jul. 31, 1990

[54] DISPERSIONS OF CROSSLINKED POLYMER MICRO-PARTICLES IN AQUEOUS MEDIA, A PROCESS FOR THE PREPARATION OF THESE DISPERSIONS, AND COATING COMPOSITIONS CONTAINING THESE DISPERSIONS

[75] Inventors: Hans-Dieter Hille, Bergisch-Gladbach; Horst Muller, Cologne; Arnold Dobbelstein, Münster, all of Fed. Rep. of Germany

[73] Assignee: BASF Lacke & Farben Aktiengesellschaft, Münster, Fed. Rep. of Germany

[21] Appl. No.: 267,126

[22] PCT Filed: Feb. 6, 1987

[86] PCT No. PCT EP87/00056

§ 371 Date: Aug. 26, 1988

§ 102(e) Date: Aug. 26, 1988

[87] PCT Pub. No.: WO87/05305

PCT Pub. Date: Sep. 11, 1987

[30] Foreign Application Priority Data

Feb. 28, 1986 [DE] Fed. Rep. of Germany ....... 3606512

[51] Int. Cl.$^5$ .................. C08L 75/06; C08G 18/42
[52] U.S. Cl. .................. 524/591; 524/839
[58] Field of Search .................. 524/839, 591

[56] References Cited

U.S. PATENT DOCUMENTS

| | | | |
|---|---|---|---|
| 4,083,831 | 4/1978 | Santosusso | 528/52 |
| 4,172,191 | 10/1979 | Nachtkamp et al. | 528/61 |
| 4,184,989 | 1/1980 | Flakus et al. | 524/591 |
| 4,203,883 | 5/1980 | Hangauer | 524/591 |
| 4,507,431 | 3/1985 | Stutz et al. | 524/840 |
| 4,558,090 | 12/1985 | Drexler et al. | 524/591 |
| 4,857,565 | 8/1989 | Henning et al. | 524/591 |
| 4,870,129 | 9/1989 | Henning et al. | 524/839 |

*Primary Examiner*—Maurice J. Welsh
*Assistant Examiner*—Rabon Sergent
*Attorney, Agent, or Firm*—Kenyon & Kenyon

[57] ABSTRACT

Dispersions of crosslinked polymer micro-particles in aqueous media, a process for the preparation of these dispersions, and coating compositions containing these dispersions.

The invention relates to dispersions of crosslinked polymer micro-particles in aqueous media, which have been prepared:

(1) by dispersing a mixture of the components (A) and (B) in an aqueous medium, the component (A) being composed of one or more polyester-polyols containing at least 2 hydroxyl groups, and the component (B) being composed of one or more polyisocyanate compounds, and the component (A) having available a number of ionic groups, preferably carboxylate groups, sufficient to form a stable dispersion, and at least one part of the components (A) and/or (B) containing more than 2 hydroxyl or isocyanate, respectively, groups per molecule and (2) by subsequently heating the dispersion thus obtained to a temperature sufficiently high for the components (A) and (B) to react to form crosslinked polymer micro-particles.

18 Claims, No Drawings

DISPERSIONS OF CROSSLINKED POLYMER MICRO-PARTICLES IN AQUEOUS MEDIA, A PROCESS FOR THE PREPARATION OF THESE DISPERSIONS, AND COATING COMPOSITIONS CONTAINING THESE DISPERSIONS

The invention relates to dispersions of crosslinked polymer micro-particles in aqueous media.

It is an acknowledged objective of paint manufacturers to reduce, as far as possible, the proportion of organic solvents in coating compositions.

One route towards achieving this objective is the development of water-dilutable coating compositions.

Particularly in the field of the application of automobile paints, but also in other fields, there is considerable interest in aqueous paint systems.

In the application of automobile paints, multi-coat paint coatings of the "base coat/clear coat" type have made considerable headway, above all for metal effect paint coatings.

"Base coat/clear coat" paint coatings are produced by initially applying a pigmented base lacquer and exposing this to the air for a short period without a baking stage (wet-on-wet process) and then overlacquering with a clear lacquer, and finally baking the base lacquer and the clear lacquer together.

There has been no lack of attempts to prepare at least the base coats of these two-coat systems from aqueous coating compositions.

The coating agents for the production of these base coats must be processable by the streamlined "wet-on-wet" process which is nowadays customary, i.e. they must, after as short as possible a pre-drying time and no baking stage, be capable of being overlacquered with a (transparent) top coat without exhibiting troublesome partial solution and "strike in" phenomena.

Besides this, further problems also have to be solved in developing coating agents for base coats of metal effect paints. The metal effect depends crucially on the orientation of the metal pigment particles in the lacquer film. A metal effect base lacquer which can be processed by the "wet-on-wet" process must therefore produce lacquer films in which the metal pigments are present in an advantageous spatial orientation after application and in which this orientation is rapidly fixed in such a way that it cannot be disturbed in the course of the further lacquering process.

The replacement of the organic solvents employed in conventional paint systems involves a series of problems.

Thus, for example, the rheology (viscosity behavior during application, pseudoplasticity, thixotropy, leveling and run-off properties) of conventional paint systems can be selectively controlled by relatively simple means via the evaporation behavior of the organic solvents or solvent mixtures used. In the case of aqueous systems, it is only possible to utilize these possible means to a very limited extent or not at all.

However, it is precisely in the production of multi-coat paint coatings of high-grade quality, in particular metal effect paint coatings, that it is extremely important to control the rheological properties of the coating compositions employed.

Thus, for example, a rapid increase in viscosity after application has a very advantageous effect on the orientation and fixation of the metal pigment particles in metal effect base lacquers.

However, in the case of other coating processes—in particular in the case of coatings applied by spraying—the quality of the coatings obtained also depends to a great extent on the rheological properties of the coating compositions used.

It is known that the rheological properties of aqueous coating compositions can be affected by adding crosslinked polymer micro-particles.

It is also known that, in the production of multi-coat coatings of the base coat/clear coat type, the troublesome partial solution and strike in phenomena mentioned above are restrained if base coating compositions containing crosslinked polymer micro-particles are employed.

Thus EP 38,127 discloses a process for the production of multi-coat coatings of the base coat/clear coat type, in which aqueous base coating compositions which contain a stable dispersion of crosslinked polymer micro-particles and have a pseudoplastic or thixotropic character are used.

The incorporation of crosslinked polymer micro-particles into coating compositions can give rise to problems due to incompatibilities between the micro-particles and other constituents of the lacquer, in particular between microparticles and the remaining components of the binder.

If, for example, the refractive index of the crosslinked polymer micro-particles is not carefully adjusted to suit the refractive index of the remaining constituents of the binder, cloudy lacquer films are formed as the result of light-scattering effects.

Investigations have shown that aqueous coating compositions containing polyurethanes and, if appropriate, also polyesters as the main constituents of the binder possess very advantageous properties and are very suitable, in particular, for use as base coating compositions in two-coat metal effect paint coatings of the base coat/clear coat type (cf, for example, U.S. Pat. Specification 4,558,090).

If the micro-particles composed of crosslinked acrylic polymers which are singled out as particularly suitable in EP 38,127 are incorporated into coating compositions of this type, problems due to incompatibilities between the micro-particles and the remaining components of the binder, especially cloudiness phenomena, in the resulting coats of paint are often observed.

Reference is made in EP 38,127 to the fact that the cross-linked polymer micro-particles can also be composed of crosslinked polycondensates, such as, for example, cross-linked polyester micro-gel particles. It is also noted, however, that the preparation of truly cross-linked polycondensates, such as, for example, polyesters, can cause difficulties.

British Pat. No. 1,403,794, which is quoted in EP 38,127, describes a process for the preparation of dispersions of polymer micro-particles in organic solvents which is stated to be applicable both to polymers obtained via polyaddition reactions and to polymers obtained via polycondensation reactions.

This process can, however, only be used in cases where one of the monomers is solid and sparingly soluble in the organic reaction medium at the polymerization temperature and where the other monomers which may possibly still be present are appreciably soluble in the organic reaction medium.

In the first stage of the process disclosed in British Pat. No. 1,403,794, the solid sparingly soluble monomer is dispersed by means of grinding processes in the organic reaction medium, which contains a suitable stabilizing agent. The dispersion, which optionally also contains further monomers, is then heated to the polymerization temperature. The polymerization must be carried out in the presence of a stabilizer which stabilizes the resulting polymer.

For a number of reasons, the process described in British Pat. No. 1,403,794 is not suitable for the synthesis of crosslinked polymer micro-gel particles which could be employed, with prospects of success, in aqueous systems instead of crosslinked acrylic polymer micro-particles:

(1) The process is extremely involved and initially only affords dispersions in organic media, which must subsequently be converted into aqueous dispersions.

(2) The selection of monomers is very severely limited as a result of the conditions relating to the melting point and solubility, and the selective synthesis of a wide range of "tailor-made" polymer micro-gel particles is not possible.

(3) It is not possible to prepare, by the process described in British Pat. No. 1,403,794, aqueous dispersions of crosslinked polymer micro-gel particles having a diameter of less than 1 micrometer. (Aqueous dispersions containing particles having a diameter above 1 pm exhibit sedimentation phenomena and, in general, cannot be used as rheological aids and can give rise to problems in the finished lacquer film.)

The problem on which the present invention is based, accordingly consisted in the preparation, in aqueous media, of dispersions of crosslinked polymer micro-particles by means of which it is possible to influence the rheological properties of aqueous coating compositions, and which, as constituents in base coating compositions of the base coat/ clear coat type, exhibit the favorable effects illustrated above and which can be adjusted in an optimum manner and with minimum effort to suit, in particular, aqueous coating compositions containing polyurethanes and, if appropriate, also polyesters as main constituents of the binder.

Surprisingly, this object is achieved by means of dispersions of crosslinked polymer micro-particles in aqueous media wherein the dispersions have been prepared:

(1) by dispersing a mixture of the components (A) and (B) in an aqueous medium, the component (A) being composed of one or more polyester-polyols containing at least 2 hydroxyl groups, and the component (B) being composed of one or more polyisocyanate compounds, and the component (A) having available a number of ionic groups, preferably carboxylate groups, sufficient to form a stable dispersion, and at least one part of the component (A) and/or (B) containing more than 2 hydroxyl or isocyanate, respectively, groups per molecule and (2) by subsequently heating the dispersion thus obtained to a temperature sufficiently high for the components (A) and (B) to react to form crosslinked polymer micro-particles.

The dispersions according to the invention make it possible to influence selectively the rheological properties of aqueous coating compositions.

For a satisfactory solution of the problem on which the present invention is based it is necessary that the diameter of the crosslinked polymer micro-particles present in the dispersions according to the invention should be less than one micrometer, preferably between 0.05 and 0.2 $\mu$m.

One great advantage of the dispersions according to the invention can be seen in the fact that the particle size of the crosslinked polymer micro-particles can be controlled by simple means (for example via the amount of ionic groups present in the starting component (A)), and that crosslinked particles having a diameter of less than 1 $\mu$m, preferably 0.05 to 0.2 $\mu$m, can be obtained without difficulty.

In addition, however, the swelling behavior of the cross-linked particles can be influenced selectively, in a simple manner and within wide limits.

Whereas in the case of polymer micro-particles based on vinyl monomers, essentially only one modification of the polymer side chains is ever possible, in the case of the micro-gel dispersions according to the invention the network structure of the particles can be influenced by the selective incorporation of specific chain segments.

It is known that the flow behavior of aqueous dispersions depends, inter alia, greatly on the size and the swelling behavior of the particles present in the dispersions.

Selectively influencing these two parameters in a manner which can be carried out by simple means and within wide limits is not possible in the case of the aqueous dispersions, in particular dispersions based on acrylic polymers, belonging to the state of the art.

Since the chemical composition of the polymer microparticles present in the dispersions according to the invention can be varied in a simple manner within extremely wide limits, it is possible to adjust the dispersions according to the invention by simple means and in an optimum manner to suit any other binder components present in the coating compositions.

Thus the dispersions according to the invention can be processed to give aqueous coating compositions from which it is possible, above all in cases where polyurethanes and, if appropriate, also polyesters are present as main constituents of the binder, to produce coatings having excellent optical properties and no cloudiness at all.

Excellent multi-coat paint coatings which exhibit no strike-in phenomena at all and, in the case of metallic finishes, any cloud formation phenomena either and which exhibit an excellent metal effect are obtained when the dispersions according to the invention are employed in base coating compositions for the production of multi-coat coatings of the base coat/clear coat type applied by the wet-on-wet process—in particular metal effect paint coatings.

Here too, the best results are achieved using coating compositions containing polyurethanes and, if appropriate, also polyesters as main components of the binder.

However, it is also possible to achieve results with other binder systems which are often better than those which can be achieved using micro-particles based on acrylic polymers as the sole micro-particle component.

In some cases, it has proven advantageous to mix microparticles composed of acrylic polymers into the coating compositions according to the invention.

The present invention also relates to a process for the preparation of the dispersions described above, which comprises preparing the dispersions:

(1) by dispersing a mixture of the components (A) and (B) in an aqueous medium, the component (A) being composed of one or more polyester-polyols containing at least 2 hydroxyl groups, and the component (B) being composed of one or more polyisocyanate compounds, and the component (A) having available a number of ionic groups, preferably carboxylate groups, sufficient to form a stable dispersion, and at least one part of the component (A) and/or (B) containing more than 2 hydroxyl groups or isocyanate, respectively, groups per molecule, and (2) by subsequently heating the dispersion thus obtained to a temperature sufficiently high for the components (A) and (B) to react to form crosslinked polymer micro-particles.

A review of the customary techniques for the preparation of aqueous polyurethane dispersions, inter alia also polyurethane dispersions which can be employed for coating purposes, is given in "Aqueous Dispersions of Crosslinked Polyurethanes" (Tirpak & Markusch, Proc. 12the Waterborne and Higher Solids Coatings Symp., New Orleans 1985, 159-73) (1).

(1) also contains a report, referring to U.S. Pat. No. 3,870,684, of attempts to prepare dispersions of crosslinked polymer micro-particles containing urea groups in an aqueous medium, in which polyurethane ionomers which contain terminal isocyanate groups and are dispersed in an aqueous phase are crosslinked with polyamines. This process is limited to the use of polyamines as the crosslinking agent and only makes it possible to prepare unstable, sedimenting, redispersible, aqueous dispersions composed of particles having a diameter from 1 to 1000 μm.

U.S. Pat. No. 3,870,684 contains no indication at all that the dispersions disclosed therein can be employed as auxiliaries in the sense described above in aqueous coating compositions.

The process according to the invention, however, affords stable aqueous dispersions containing crosslinked polymer micro-particles having a diameter of less than 1 μm, preferably between 0.05 and 0.2 pm.

It is also possible, of course, to prepare polymer microparticles having a diameter greater than 1 μm in accordance with the process according to the invention.

According to (1), the process described in U.S. Pat. No. 3,870,684 should result in stable, aqueous dispersions having excellent film-forming properties if the polyurethane ionomers containing terminal isocyanate groups have been modified by the introduction of polyoxyethylene blocks (cf. U.S. Pat. No. 4,408,008).

However, this process too only permits in exceptional cases a reproducible, controlled synthesis of crosslinked polymer micro-particles having a diameter of less than 1 μm, and here too those skilled in the art are limited in the choice of the polyurethane ionomer, which certainly must necessarily contain polyoxyethylene units, as a result of which the possibilities of selectively adjusting the polymer micro-particles to suit the remaining binder system become extremely limited.

U.S. Pat. No. 4,293,679 describes a process for the preparation of aqueous dispersions of crosslinked polymer micro-particles containing urea groups, in which a hydrophilic prepolymer which contains free isocyanate groups and has been prepared from a polyol composed of at least 40 % by weight of ethylene oxide units and from a polyisocyanate compound is dissolved in a water-soluble organic solvent and is then reacted, with stirring, with a large excess of water.

In this process, the size of the particles formed depends quite appreciably on the viscosity of the prepolymer solution, the stirrer speed and the addition of surface-active substances.

In order to prepare particles having a diameter of 1 μm it is necessary to process prepolymer solutions of a relatively low viscosity using high-performance high-speed stirrers and with the addition of surface-active substances.

These process conditions are associated with considerable disadvantages.

Problems of reproducibility are encountered; the use of high-speed stirrers is associated with considerable technical outlay, and the addition of surface-active compounds impairs the quality achievable in the coatings.

A further serious disadvantage of the process disclosed in U.S. Pat. No. 4,293,679 is that the prepolymers which can be employed are limited to substances which are composed of at least 40% by weight of ethylene oxide units and have a strongly hydrophilic character.

Those skilled in the art are thereby no longer able to prepare micro-gels especially designed to suit requirements, because their choice of starting compounds has been fixed to a large extent.

In addition, the high proportion of hydrophilic molecular groupings results in moisture-sensitive films.

Finally, it should also be mentioned that no indication at all is to be found in the two U.S. Pat. Nos. 4,408,008 and 4,293,679, either, to the effect that the dispersions disclosed therein can be employed as auxiliaries in the sense described above in aqueous coating compositions.

In what follows, the dispersions according to the invention and the process for their preparation will be described in greater detail:

The first stage in the preparation of the dispersions according to the invention consists in making up a mixture of the components (A) and (B), in which respect care must be taken that the component (A) has available a number of ionic groups, preferably carboxylate groups, sufficient for the formation of a stable dispersion, and that at least one part of the component (A) and/or (B) contains more than 2 hydroxyl groups or isocyanate groups, respectively, per molecule.

The term "stable dispersion" is to be understood as meaning dispersions in which the dispersed particles only coagulate after being applied and after the release of the dispersing medium.

In some cases it can be beneficial to incorporate in the component (A) not only ionic groups, but also further stabilizing groups, such as, for example, polyoxyalkylene groups.

Either anionic or cationic stabilization is possible, anionic stabilization, preferably via carboxylate groups, being preferred.

The determination of the optimum concentration of ionic groups in the component (A) for the formation of a stable dispersion can be carried out by the average expert with the aid of simple routine tests. The concentration of ionic groups which is as a rule necessary for the formation of a stable dispersion is between 0.01 and 2 milliequivalents per gram of component (A).

The neutralization, necessary in certain circumstances, of groups capable of forming salts, using bases or acids is preferably carried out shortly before or during the dispersion of the mixture composed of the components (A) and (B) in the aqueous dispersing medium.

Suitable groups capable of forming salts are, above all, carboxylic and sulfonic acid groups. These groups are preferably neutralized with a tertiary amine.

Examples of tertiary amines suitable for neutralizing the groups capable of forming anions are trimethylamine, triethylamine, dimethylaniline, diethylaniline, triphenylamine, N,N dimethylethanolamine, morpholine and the like.

The content of ionic groups or the degree of neutralization of the groupings suitable for forming salts is an important parameter, by means of which it is possible to control the size of the crosslinked polymer micro-particles formed.

When making up the mixture composed of the components (A) and (B), care should be taken that premature crosslinking reactions of any type between the components (A) and (B) do not take place before the mixture is dispersed in the aqueous dispersing medium.

The component (A) is composed of one or more polyesterpolyols containing at least 2 hydroxyl groups.

Examples of suitable polyester-polyols are, in particular, the reaction products, known per se in polyurethane chemistry, of polyhydric polyols with polycarboxylic acids or polycarboxylic anhydrides.

Examples of polyols suitable for the preparation of the polyester-polyols are ethylene glycol, 1,2-propanediol, 1,3-propanediol, 1,3-butanediol, 1,4-butanediol, the isomeric pentanediols, hexanediols or octanediols, such as, for example, 2-ethyl-1,3-hexanediol, trimethylolpropane, glycerol, bishydroxymethylcyclohexane, erythritol, mesoerythritol, arabitol, adonitol, xylitol, mannitol, sorbitol, dulcitol, hexanetriol, (poly)-pentaerythritol and the like.

The polycarboxylic acids which are suitable for the preparation of the polyester-polyols are composed primarily of low-molecular polycarboxylic acids or anhydrides thereof having 2–18 carbon atoms in the molecule.

It is preferable to employ dicarboxylic and tricarboxylic acids.

Examples of suitable acids are oxalic acid, succinic acid, fumaric acid, phthalic acid, isophthalic acid, terephthalic acid, tetrahydrophthalic acid, hexahydrophthalic acid, adipic acid, azelaic acid, sebacic acid, maleic acid, glutaric acid, hexachloroheptanedicarboxylic acid, tetrachlorophthalic acid and trimellitic acid. The anhydrides of these acids, insofar as they exist, can also be employed instead of the acids.

It is also possible to employ, as the component (A), polyester-polyols which have been prepared by polymerizing lactones.

Particularly good results have been achieved with polyester-polyols in which the molecules each carry, on average, one carboxylate group and at least two, preferably more than two, hydroxyl groups.

The (A) component is selected in such a way that it can, on its own, be dispersed in the aqueous medium to form a stable dispersion. The correlations between the structure of polyester-polyols (acid number, molecular weight ....) and their dispersing behavior are well known to the average expert, and he can, with the aid of a few scouting preliminary tests, select the polyester-polyol component best suited for solving the particular problem set.

It is also possible to add, to the polyester-polyols employed as the (A) component, further compounds containing groups which are reactive towards isocyanate groups. In doing so, care must be taken that the mixture formed from the components remains stably dispersible in the aqueous medium and that the crosslinked polymer micro-particles formed from this dispersion have the desired size.

The polyether-polyols which are known per se in polyurethane chemistry may be mentioned as examples of compounds which can be added to the polyester-polyols which form the component (A).

Suitable components (B) are, in principle, any organic compounds containing isocyanate groups. The following may be mentioned as examples: trimethylene diisocyanate, tetra-methylene diisocyanate, pentamethylene diisocyanate, hexamethylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4'-biphenylene diisocyanate, 1,5-naphthylene diisocyanate, 1,4-naphthylene diisocyanate, 1-isocyanatomethyl-5-isocyanato-1,3,3-trimethylcyclohexane, bis-(4-isocyanatocyclohexyl)-methane, bis-(4-isocyanatophenyl)-methane, 4,4'-diisocyanatodiphenyl ether and 2,3-bis-(8-isocyanatooctyl)-4-octyl-5-hexyclyclohexene.

It is also possible to employ prepolymers containing isocyanate groups as polyisocyanate components.

Examples of suitable prepolymers are reaction products formed from polyisocyanates, polyether-polyols and/or polyester-polyols and, if appropriate, customary chain lengtheners.

In the present invention, it is preferable to employ polyisocyanate components in which the isocyanate groups are attached to (cyclo)aliphatic radicals.

Polyisocyanate compounds containing isocyanate groups attached to aromatic groups can only be employed in exceptional cases (for example as a part component of the component (B)) because of their high reactivity towards water.

The crosslinking density of the polymer micro-particles formed can be influenced by the molar ratio of the components (A) and (B) and the number of groups which are reactive towards isocyanate groups, or isocyanate groups, present in the components (A) and (B) and by the reaction conditions selected for the preparation of crosslinked polymer micro-particles.

The crosslinking density in turn is correlated to a considerable extent with the rheological properties of the dispersions formed.

Thus, for example, a decrease in the degree of crosslinking can result in the polymer micro-gel particles having a greater swelling capacity and, as a result of this, in an increase in the pseudo-plastic flow behavior of the dispersions formed.

The swelling behavior of the polymer micro-gel particles can also be controlled via the chemical nature of the components (A) or (B) (incorporation of segments of molecules which are hydrophilic to a greater or lesser degree; incorporation of parts of molecules having a greater or lesser degree of rigidity).

Mixtures of the components (A) and (B) which are particularly preferred are composed of polyester-polyols in which the molecules each carry, on average, one carboxyl group and at least three hydroxyl groups, and triisocyanate compounds in which the isocyanate groups are attached to (cyclo)aliphatic radicals.

The mixture composed of the components (A) and (B) can be dispersed undiluted in the aqueous dispersing medium.

However, it is more advantageous to dissolve or disperse the components (A) and (B) in a water-miscible organic solvent which is inert towards isocyanate groups and preferably boils below 100° C., and then to disperse this solution or dispersion in the aqueous dispersing medium.

In principle, any organic solvents which are miscible with water and inert towards isocyanate groups can be used as the solvent or dispersing agent for the mixture composed of the components (A) and (B).

It is advantageous to use organic solvents having a boiling point below 100° C. Particularly good results can be obtained with acetone and methylethyl ketone.

The aqueous dispersing medium in which the mixture of (A) and (B) is dispersed is composed of water, but can also contain organic solvents. Examples which may be mentioned of solvents which can be present in the water are heterocyclic, aliphatic or aromatic hydrocarbons, monohydric or polyhydric alcohols, ethers, esters and ketones, such as, for example, N-methylpyrrolidone, toluene, xylene, butanol, ethylglycol and butylglycol and acetates thereof, butyldiglycol, ethylene glycol dibutyl ether, ethylene glycol diethyl ether, diethylene glycol dimethyl ether, cyclohexanone, methyl ethyl ketone, acetone, isophorone or mixtures thereof.

When the mixture composed of (A) and (B) has been transferred into the aqueous dispersing medium, a stable aqueous dispersion is obtained, composed of particles the size of which can be affected by selective variation of the parameters described above. The dispersion thus obtained is then heated to a temperature sufficiently high for the components (A) and (B) to react to give crosslinked polymer micro-particles.

Before the reaction between the components (A) and (B), the organic solvent used for dispersing or dissolving the mixture composed of the components (A) and (B) can be removed by distillation, if appropriate in vacuo, at a temperature below the reaction temperature required for the formation of crosslinked polymer micro-gel particles; it is also possible, however, to distill off the organic solvent in the course of the crosslinking reaction.

A further phenomenon, which is entirely surprising and difficult to explain for the time being, has been observed when the dispersions according to the invention are prepared: if the reaction of the components (A) and (B) is carried out at a solids content >30% by weight and if the solids content of the dispersion is reduced in the course of the crosslinking reaction, the dispersions formed exhibit non-Newtonian viscosity to a greater extent than dispersions in the preparation of which the components (A) and (B) have been reacted at a solids content less than 30% by weight.

Embodiments of the invention which are very particularly preferred consist in the dispersions illustrated in greater detail above having been prepared:

(1) by dispersing a mixture of the components (A) and (B) in an aqueous medium, the component (A) being composed of polyester-polyols in which the molecules each, on average, carry one carboxylate group and at least two, preferably more than two, hydroxyl groups, and the component (B) is composed of polyisocyanate compounds which preferably contain more than two isocyanate groups attached to (cyclo)aliphatic radicals, and the components (A) and (B) being dissolved or dispersed in a water-miscible organic solvent which boils below 100° C. and is inert towards isocyanate groups, preferably acetone and/or methyl ethyl ketone, and (2) by subsequently heating the dispersion thus obtained to a temperature sufficiently high for the components (A) and (B) to react to form crosslinked polymer microparticles, the solvent used for dissolving or dispersing the mixture composed of the components (A) and (B) being removed by distillation either before the reaction between the components (A) and (B) at a temperature below the reaction temperature required for the formation of the crosslinked micro-particles, or being removed by distillation at a temperature at least as high as the reaction temperature required for the formation of the crosslinked particles.

The present invention also relates to coating compositions which, in addition to the dispersions according to the invention, can also contain further film-forming material, if appropriate pigments and further customary additives, and which are preferably suitable for the production of base coats of multi-coat, protective and/or decorative coatings.

Coating compositions which are very particularly preferred are obtained if the dispersions according to the invention are incorporated in the coating compositions disclosed in German patent application DE 3,545,618.

The coating compositions described above are preferably used in processes for the production of multi-coat coatings on substrate surfaces in which:

(1) an aqueous dispersion is applied as the base coating composition,
(2) a polymer film is formed on the substrate surface from the composition applied in stage (1),
(3) a suitable transparent top layer composition is applied to the base coat thus obtained, and subsequently
(4) the base coat is baked together with the top coat.

In principle, any known coating agent which is not pigmented or only transparently pigmented is suitable for use as the top coat composition. This coating agent can be a conventional solvent-containing clear lacquer, a water-dilutable clear lacquer or a powder clear lacquer.

Substrates suitable for coating are, above all, pretreated metal substrates, but it is also possible to coat metals which have not been pretreated and any desired other substrates such as, for example, wood, plastics and the like using the base coating compositions according to the invention together with a multi-coat, protective and/or decorative coating.

The invention is illustrated in greater detail in the following examples. All data relating to parts and percentages are in terms of weight, unless anything to the contrary is expressly stated.

EXAMPLE 1

Preparation of the polyester-polyol

A polyester having an acid number of 43 and an OH equivalent weight of 433 is prepared from 1,6-hexanediol, isophthalic acid and trimellitic anhydride in the ratio of 3:1:1. This polyester is dissolved in methylethyl ketone to form an 80% strength solution.

Preparation of the isocyanate 333 g of isophorone diisocyanate are dissolved in 200 g of methylethyl ketone, and 0.5 g of dibutyltin dilaurate is added. 67 g of trimethylolpropane are then added in portions at such a rate that the temperature does not exceed 70° C. After 4 hours the NCO content is 10 %.

Preparation of the micro-gel dispersion 500 g of the polyester solution and 370 g of the isocyanate are mixed in a four-necked flask with stirring and with the addition of an additional 100 g of methyl ethyl ketone. A solution of 16.7 g of dimethylethanolamine in 710 g of water is added to this mixture (degree of neutralization 61 %). A milky-white dispersion is formed. The dispersion is then heated to 90° C. with stirring and is kept at 90–95° C. for approx. 3 hours. In the course of this the methyl ethyl ketone distills off, and a 45% strength aqueous, coagulate-free dispersion of crosslinked particles is obtained.

Proof:

5 ml of THF are added to 1 ml of this dispersion. A bluish-white glistening dispersion is formed, and this does not redissolve even when dimethylformamide is added.

We claim:

1. A dispersion of crosslinked polymer micro-particles in an aqueous medium, wherein the dispersion has been prepared:
   (1) by dispersing a mixture of the components (A) and (B) in an aqueous medium, the component (A) being composed of one or more polyester-polyols containing at least 2 hydroxyl groups, and the component (B) being composed of one or more polyisocyanate compounds, and the component (A) having available a number of ionic groups sufficient to form a stable dispersion, and at least one part of the components (A) and/or (B) containing more than 2 hydroxyl or isocyanate, respectively, groups per molecule and
   (2) by subsequently heating the dispersion thus obtained to a temperature sufficiently high for the components (A) and (B) to react to form crosslinked polymer micro-particles.

2. A dispersion as described in claim 1 wherein a polyesterpolyol in which the molecules each carry, on average, one carboxylate group as the ionic group and at least two hydroxyl groups is employed as component (A).

3. A dispersion as claimed in one of claims 1 or 2, wherein a polyisocyanate compound in which the isocyanate groups are attached to a aliphatic radical is employed as the component (B).

4. A dispersion as claimed in one of claims 1, 2 or 3, wherein the mixture of the components (A) and (B) is dispersed in the aqueous medium in the form of a solution or dispersion in a water-miscible, organic solvent or solvent mixture which boils below 100° C. and is inert towards isocyanate groups.

5. A dispersion as claimed in claim 4, wherein the organic solvent or solvent mixture is removed by distillation before the reaction of the components (A) and (B), at a temperature below the reaction temperature required for the formation of crosslinked polymer micro-particles.

6. A dispersion as claimed in claim 4, wherein the organic solvent or solvent mixture is removed by distillation at a temperature which is at least as high as the reaction temperature required for the formation of crosslinked polymer micro-particles.

7. A dispersion as claimed in one of claims 1, 2, 3, 4, 5 or 6 wherein the reaction of the components (A) and (B) to give crosslinked polymer micro-particles is carried out at a solids content of 30% by weight, and the solids content is reduced in the course of the crosslinking reaction.

8. A dispersion as claimed in claim 1, 2, 3, 4, 5, 6 or 7 wherein said crosslinked polymer micro-particles have a diameter from about 0.05 to 0.2 microns.

9. The use of the dispersions as claimed in one of claims 1 to 7 and 8 in coating compositions.

10. A process for the preparation of dispersions of crosslinked polymer micro-particles in aqueous media, wherein the dispersions are prepared:
    (1) by dispersing a mixture of the components (A) and (B) in an aqueous medium, the component (A) being composed of one or more polyester-polyols containing at least 2 hydroxyl groups, and the component (B) being composed of one or more polyisocyanate compounds, and the component (A) having available a number of ionic groups sufficient to form a stable dispersion, and at least one part of the components (A) and/or (B) containing more than 2 hydroxyl or isocyanate, respectively, groups per molecule and
    (2) by subsequently heating the dispersion thus obtained to a temperature sufficiently high for the components (A) and (B) to react to form crosslinked polymer micro-particles.

11. A process as described in claim 10 wherein the reaction of components (A) and (B) to give crosslinked polymer micro-particles is carried out at as a solids content of 30% by weight, and the solids content is reduced in the course of the crosslinking reaction.

12. A process as described in claim 10 wherein said crosslinked polymer micro-particles formed have a diameter from about 0.05 to 0.2 microns.

13. A process as defined in claim 10 wherein component (A) is a polyester-polyol in which the molecules each carry, on average, one carboxylate group as the ionic group and at least two hydroxyl groups.

14. A process as defined in claim 10 wherein a polyisocyanate compound is employed as component (B) and in which the isocyanate groups are attached to a (cyclo)aliphatic radical.

15. A process as defined in claim 14 wherein the mixture of components (A) and (B) is dispersed in the aqueous medium in the form of a solution or dispersion in a water miscible, organic solvent or solvent mixture, which boils below 100° C. and is inert towards isocyanate groups.

16. A process as described in claim 15 wherein the organic solvent or solvent mixture is removed by distillation before the reaction of the components (A) and (B) at a temperature below the reaction temperature required for the formation of crosslinked polymer micro-particles.

17. A process as defined in claim 15 wherein the organic solvent or solvent mixture is removed by distillation at a temperature which is at least as high as the reaction temperature required for the formation of crosslinked polymer micro-particles.

18. A coating composition which is composed of a dispersion of crosslinked polymer micro-particles in an aqueous medium and which, in addition to the polymer microparticles, can also additionally contain further film-forming material, pigments and further customary additives, and which is suitable for the production of base coats of multi-coat, protective or decorative coatings, wherein the dispersion of crosslinked polymer micro-particles in an aqueous medium has been prepared:
 (1) by dispersing a mixture of the components (A) and (B) in an aqueous medium, the component (A) being composed of one or more polyester-polyols containing at least 2 more polyisocyanate compounds, and the component (A) having available a number of ionic groups sufficient to form a stable dispersion, and at least one part of the components (A) and/or (B) containing more than 2 hydroxyl or isocyanate, respectively, groups per molecule and
 (2) by subsequently heating the dispersion thus obtained to a temperature sufficiently high for the components (A) and (B) to react to form cross-linked polymer microparticles.

* * * * *

UNITED STATES PATENT AND TRADEMARK OFFICE
CERTIFICATE OF CORRECTION

PATENT NO. : 4,945,128
DATED : July 31, 1990
INVENTOR(S) : Hans-Dieter Hille et al.

It is certified that error appears in the above-identified patent and that said Letters Patent is hereby corrected as shown below:

In Column 5, line 39, change "...and 0.2 pm." to read
--...and 0.2 $\mu$m.--

Column 13, line 6, claim 18, change "...at least 2 more..." to read

--...at least 2, hydroxyl groups, and the component (B) being composed of one or more ...--

Signed and Sealed this

Fifth Day of May, 1992

Attest:

DOUGLAS B. COMER

*Attesting Officer*    *Acting Commissioner of Patents and Trademarks*